United States Patent [19]

Yano

[11] 4,363,729

[45] Dec. 14, 1982

[54] MAGNETIC FILTER

[75] Inventor: Junichi Yano, Oobu, Japan

[73] Assignee: Daidotokushuko Kabushiki Kaisha, Japan

[21] Appl. No.: 274,991

[22] Filed: Jun. 18, 1981

[30] Foreign Application Priority Data

Jun. 18, 1980 [JP] Japan ................................ 55/82539

[51] Int. Cl.³ ................................................ B01D 35/06

[52] U.S. Cl. .................................................. 210/223

[58] Field of Search ................ 210/223, 222; 209/212, 209/213, 224

[56] References Cited

U.S. PATENT DOCUMENTS

| | | | |
|---|---|---|---|
| 3,757,948 | 9/1975 | Tihhonor | 210/223 |
| 4,026,805 | 5/1977 | Fouler | 210/223 |
| 4,036,758 | 7/1977 | Cambest | 210/223 |

FOREIGN PATENT DOCUMENTS

| | | | |
|---|---|---|---|
| 553830 | 1/1957 | Belgium | 210/223 |
| 66827 | 10/1950 | Netherlands | 210/223 |
| 691388 | 5/1953 | United Kingdom | 210/223 |

*Primary Examiner*—Benoît Castel
*Attorney, Agent, or Firm*—William A. Drucker

[57] ABSTRACT

A magnetic filter for separating ferromagnetic particles from a fluid. The filter includes a filter container having an inlet, outlet, and inner space wherein an annular filter element is located. A magnetic-field generating device is surrounded by the annular filter element, and is adapted to magnetize the filter element. A fluid to be filtered is allowed to enter the filter from the inlet, and ferromagnetic particles in suspension in the fluid, when passing the filter element, are attracted thereby. The purified fluid is allowed to flow out of the filter through the outlet.

4 Claims, 5 Drawing Figures

MAGNETIC FILTER

BACKGROUND OF THE INVENTION

1. Field of the Invention

This invention relates to magnetic filters for separating or recovering magnetic (or magnetically susceptible) particles such as iron powder or the like from a fluid by allowing the fluid to pass therethrough.

2. Description of the Prior Art

The above-mentioned type of magnetic filter has been widely used in various fields. The conventional type of magnetic filter is of the construction where the coil of a magnetic-field producing device surrounds the filter element. In such conventional type of magnetic filter, it is natural that the coil should have a great diameter, and when the filter element is provided with a greater diameter for treatment of a greater amount of fluid, the winding diameter of the coil must be accordingly made greater. In such case where the winding diameter of the coil is to be made greater, the making of the coil requires a greater amount of electric wires, and where such coil is employed, a greater amount of electric power is consumed.

SUMMARY OF THE INVENTION

An object of this invention is to provide a device which is adapted to separate or remove magnetic (or magnetically susceptible) particles from a fluid by allowing the fluid to pass through a filter element magnetized by a magnetic-field producing device.

Another object of this invention is to provide a device including employing a large-sized filter element, but magnetizing the large-sized filter element by using a small-sized magnetic-field producing device.

By making a filter element of a magnetic filter in an annular shape so that the filter element is given a sufficient size for providing the desired filtering capacity and locating a magnetic-field producing device in the space surrounded by the annular filter element, the magnetic-field producing device requires only a considerably smaller size than the conventional one, so that the coil used in the magnetic-field producing device only requires a smaller coil diameter. In such a construction, when the filter element is provided with a greater outside diameter for obtaining a higher filtering capacity, it is not necessary to make larger the diameter of coil of the magnetic-field producing device in proportion to the increased outside diameter of the filter element (which is the case with the conventional construction of magnetic filter), but the magnetic-field producing device only requires a smaller diameter than the conventional one. This advantage of the coil only needing a smaller size provides further advantages that the saving of material can be effected by being able to make the coil by a smaller amount of electric wire and that the coil can be energized by a smaller amount of electric power.

Other objects and advantages of the invention will become apparent during the following discussion of the accompanying drawings.

DESCRIPTION OF THE PREFERRED EMBODIMENTS

Figure 1:
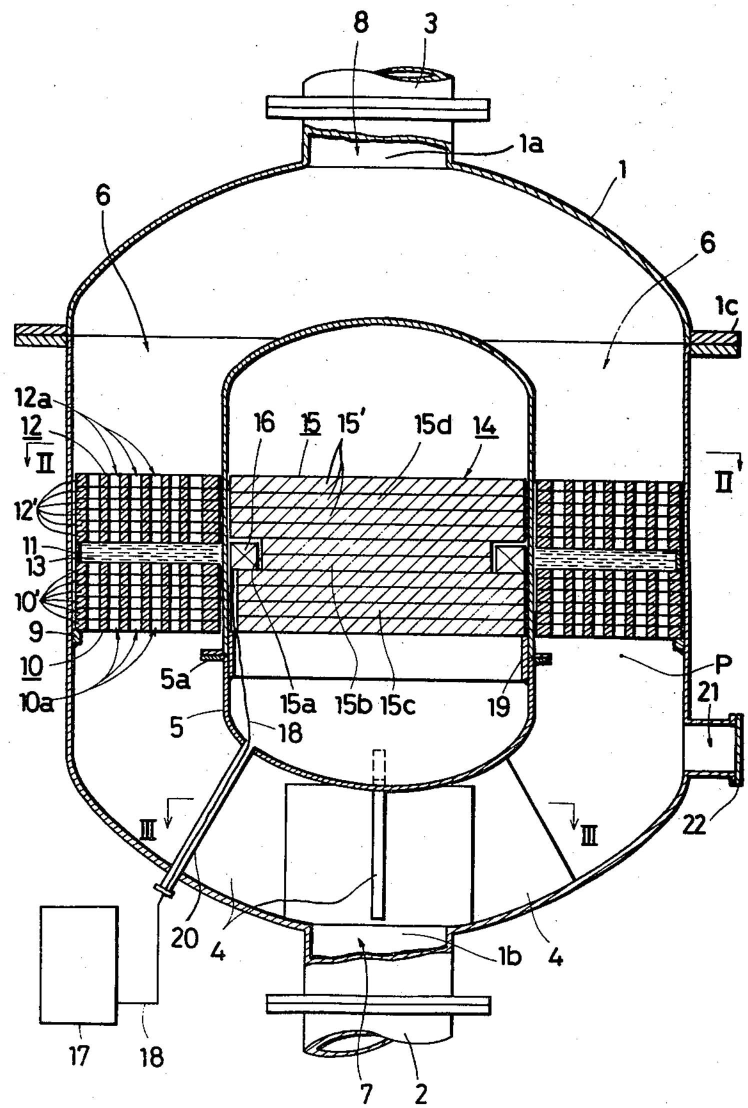
FIG. 1 is a cross section of a magnetic filter or separator according to the invention.
Figure 2:
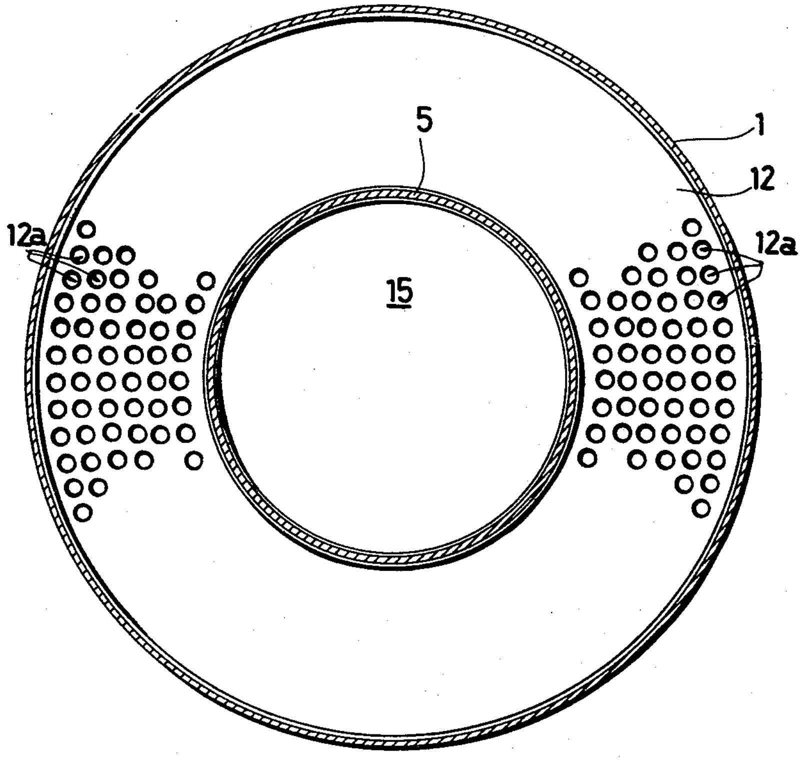
FIG. 2 is a cross section taken on the line II—II of FIG. 1.
Figure 3:
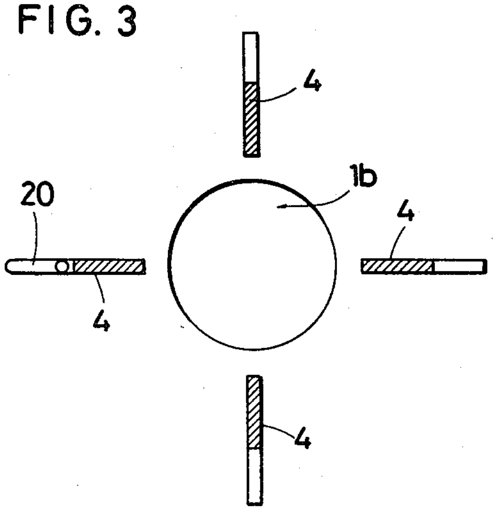
FIG. 3 is a cross section taken on the line III—III of FIG. 1.

Referring to FIG. 1, a cylindrical tank-shaped filter container 1 is made of steel plate or stainless-steel plate, and is of the type which can be separated into upper and lower portions at a flange 1*c*. The filter container 1 is preferably made of nonmagnetic (or nonmagnetizable) material, such as nonmagnetic stainless steel, in its entire body or at the whole portion adjacent to a filter element (which will be explained hereinafter). The filter container 1 includes communicating holes 1*a* and 1*b* at outlet and inlet sides thereof, respectively. An outflow pipe 3 and an inflow pipe 2 are connected to the communicating holes 1*a* and 1*b*, respectively, communicating with the inside of the filter container 1 by the communicating holes 1*a* and 1*b*, respectively. Numeral 4 designates four supports fixed on the bottom of the filter container 1. Having the shape of cylindrical tank and fixed to the supports 4, an inner container 5 is provided in an inner space of the filter container 1 in a coaxial manner with the filter container 1. Like the filter container 1, the inner container 5 is made of steel plate or stainless-steel plate, and is so constructed that the container 5 can be separated into upper and lower halves at a flange 5*a*. The inner container 5 also is so made to have a water tightness. As in the filter container 1, it is preferable to make the inner container 5 in its entire body or at the whole portion adjacent to the filter element by using a nonmagnetic (or nonmagnetizable) material, such as nonmagnetic stainless-steel plate. A flow passage 6 is provided between the filter container 1 and the inner container 5, and has an inlet 7 and an outlet 8. The filter container 1 is provided with an annular or a plurality of supports 9 which are fixed to the inner surface of the filter container 1 by welding or the like. Placed on the support or supports 9, an annular pole piece 10 is provided in the flow passage 6. The annular pole piece 10 is constructed of a plurality of perforated plates 10' (made of a magnetic or magnetizable material, commonly soft iron or magnetic stainless steel) combined together in layers, and is provided with a plurality of flow openings 10*a* to allow a fluid (to be filtered) to pass therethrough. The pole piece 10 has a perforated rate (i.e., rate of flow openings) of around 15 to 60 percent. An annular spacer 11, made of a nonmagnetic (or nonmagnetizable) material such as nonmagnetic stainless steel, is located on the pole piece 10. Separated from the pole piece 10 by the spacer 11, another pole piece 12 similar to the pole piece 10 is provided in a position opposite to the pole piece 10. The pole piece 12 comprises a plurality of perforated plates 12' (similar to those 10' of the pole piece 10) combined together in layers, and is provided with a plurality of flow openings 12*a* (similar to those 10*a* of the pole piece 10) to allow a fluid (to be filtered) to pass therethrough. As in the pole piece 10, the pole piece 12 has a perforated rate (i.e., rate of flow openings in the pole piece 12) of around 15 to 60 percent. Inside of the annular spacer 11, the filter element 13 (having an annular shape) is provided between the pole pieces 10 and 12. Constructed of magnetic fibers or balls, the filter element 13 is capable of being magnetized to attract magnetic particles from a fluid passing therethrough. Alternatively, the filter element 13 may consist of a plurality of wire gauges (made of magnetic stainless steel) combined together in layers or consist of steel wool. The filter element 13 may have a perforated rate of around 50 percent.

Located in the inner container 5, a magnetic-field producing or generating device 14 is adapted to impress a magnetic field on the filter element 13. The magnetic-field generating device 14 includes an iron core 15 placed on an annular support 19 at the circumferential portion of the lower surface of the device 14. The annular support 19 is fixed to the inner surface of the lower half of inner container 5 by welding or the like. The iron core 15 comprises a plurality of plates 15' of soft iron or magnetic (or magnetizable) stainless steel combined together in layers, and has a smaller-diameter portion **15*b* at the central portion in the axial direction of the iron core 15. The smaller-diameter portion 15*b* provides a circumferential hollow portion or annular coil-receiving portion 15*a*. As shown in FIG. 1, the smaller-diameter portion 15*b* has substantially the same thickness as that of the filter element 13. Separated from each other by the central smaller-diameter portion 15*b*, upper and lower larger-diameter portions 15*d* and 15*c* of the iron core 15 have outer surfaces which are opposite to the inner circumferential surfaces of the upper and lower pole pieces 12 and 10, respectively. Numeral 16 designates a coil provided in the coil-receiving portion 15*a*. The operating relationship among the coil 16, iron core 15, pole pieces 10 and 12, and filter element 13 is the same as the principle of an electromagnet. That is, when the coil 16 is energized, a magnetic field is generated, and the magnetic field is impressed on the filter element 13 through the pole pieces 10 and 12, causing the filter element 13 to become energized. When the energization of the coil 16 is stopped, the filter element 13** is demagnetized.

A DC power supply 17 is located outside the filter container 1 for energizing the coil 16, and is connected to the coil 16 by means of an electric wire 18 extending into the filter container 1 through a conduit tube 20 which is located transversely of the flow passage 6 within the filter container 1. Numeral 21 designates a man hole connected to the filter container 1, but closed by a lid 22 at ordinary time.

Reference is then given to the operation of the magnetic filter having the the above-mentioned construction. When the coil 16 of the magnetic-field generating device 14 is energized, the coil 16 generates a magnetic-field, which is then spread evenly over the entire filter element 13 through the iron core 15, and pole pieces 10 and 12, so that the filter element 13 becomes evenly magnetized. When the filter element 13 has thus obtained a magnetic force, a fluid containing ferromagnetic particles is introduced into the magnetic filter through the inflow pipe 2. Introduced into the filter, a stream of the fluid is allowed to flow through the flow passage 6 and through the flow openings **10*a* of the pole piece 10. When the fluid then passes the filter element 13, the ferromagnetic particles in suspension in the fluid are attracted by the filter element 13, so that a purified stream of fluid then passes through the flow openings 12*a* of the pole piece 12 and through the flow passage 6 and flows out through the outflow pipe 3**.

When the fluid is filtered in the above-mentioned manner, a certain portion of the ferromagnetic particles may be attracted by the pole piece 10 or 12 rather than the filter element 13. Incidentally, the stream of fluid to be filtered may be given, e.g., at point P. at a flow velocity within the range of (for example) 200 to 1,000 meters per hour.

When the filter element 13 has attracted a large amount of ferromagnetic particles from fluids, the filter element 13 is to be washed. The first step for washing of the element 13 is to stop the energization of the coil 16 so that the element 13 is demagnetized. The next step is to supply water with compressed air into the flow passage 6 through the outflow pipe 3. The water, together with the compressed air, is allowed to flow in the opposite direction to that of a stream of fluid to be filtered and enter into the flow openings **12*a* of the pole piece 12. The water, when then passing the element 13, causes the particles attracted by the element 13, but now free from the attracting force of the element 13 (because the element 13 is now deprived of a magnetized condition) to detach from the element 13 and to be carried away by the water through the flow opening 10*a* of the pole piece 10, flow passage 6, and inflow pipe 2**.

The above-mentioned washing of the element 13 can be made very efficiently because the compressed air supplied together with the rinsing water makes the bubbling action when the water removes the particles from the element 13. Therefore, it takes less time and trouble to wash the element 13. Alternatively, the rinsing water and compressed air for washing the element 13 may be supplied from the inflow pipe 2.

When the magnetic filter of the above-mentioned construction is designed, the size of filtering area of the filter element 13, i.e., the size of the area of the element 13 which is perpendicular to the flow direction of a fluid to be filtered is determined in accordance with the desired filtering capacity of the magnetic filter to be produced. It is then necessary to determine the diameters of filter container 1, inner container 5, and the like so that the determined filtering area of the filter element 13 is ensured and so that the magnetic-field generating device 14 can be located in the inner container 5. It is also necessary to determine the size of cross-sectional area and diameter of the smaller-diameter portion **15*b* of the iron core 15 of the magnetic-field generating device 14, i.e., the portion to be surrounded by the coil 16. Since the magnetic-field generating device 14, comprising the iron core 15 and the coil 16 provided around the smaller diameter portion 15*b*, is disposed inside the annular filter element 13, the size of cross section and diameter of the smaller-diameter portion 15*b* surrounded by the coil 16 are made considerably smaller than those of the conventional construction where the magnetic-field generating device is not surrounded by the filter element, but surrounds it. According to the construction herein, therefore, the winding diameter of the coil 16 can be made much smaller, providing the advantage that the coil 16** can be made by employing a much smaller amount of electric wire.

The above-mentioned advantage is then explained in a quantitative manner. Take a supposed case where a magnetic filter having a magnetic-flux density of 0.3 $Wb/m^2$ is impressed on a filter element having a filtering area of 20 $m^2$. In such a case, the conventional art uses a filter element having a diameter of around 5 meters together with a coil having a winding diameter of around 5 meters. According to the invention, however, the total number of magnetic fluxes required for achieving the above-mentioned objective is $20\times0.3=6$ (Wb). When the density of the magnetic flux of the iron core 15 is made around 1.5 $Wb/m^2$, therefore, the size of cross section of the portion of the iron core 15 surrounded by the coil 16 is $6\div1.5=4$ ($m^2$), and the diameter of the coil 16 is around 2.3 meters. Therefore, the winding diameter of the coil 16 is around 2.3 meters, which is less than one half of that required in the conventional art. This advantage further provides two advantages that the coil can be made by employing an amount of electric wire less than one half of that required in the conventional art and that the electric power required for energization of the coil is reduced to less than one half of that required in the conventional art.

Figure 4:
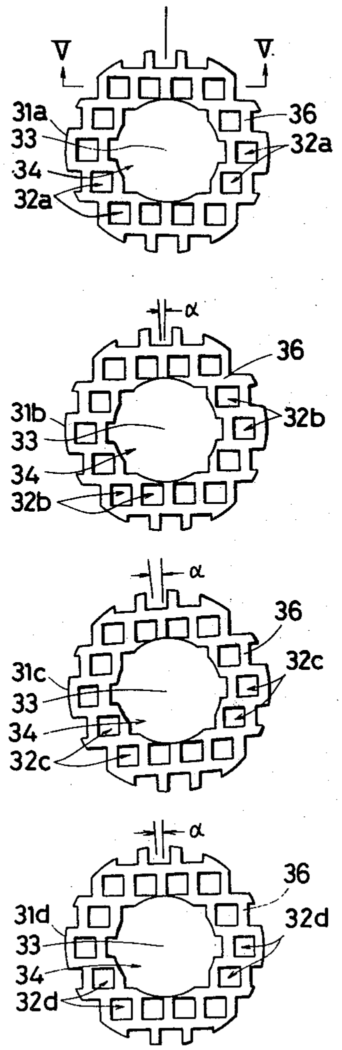
FIG. 4 shows a different embodiment of pole piece from those used in the magnetic filter of FIG. 1, illustrating a plurality of perforated plates to be combined with one another for constituting the whole pole piece.

FIG. 4 shows four identical perforated plates 31*a*, 31*b*, 31*c* and 31*d* to constitute a different embodiment of pole piece from the pole piece 10 in FIG. 1. Each of the perforated plates 31*a* to 31*d* is provided with a plurality of square-shaped perforations 32*a*, 32*b*, 32*c* and 32*d* to allow a fluid to pass therethrough. Each perforated plate is further provided with a central opening 34 which has a diameter corresponding to that of the inner container 5 to locate the container 5 inside the opening 34. Each perforated plate has a size which allows the plate to be located in the filter container 1 in immediate proximity to the inner surface of the container 1.

Figure 5:
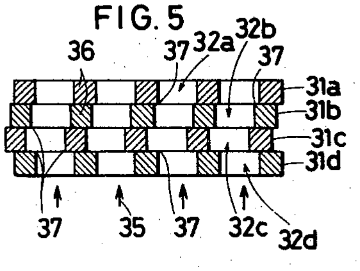
FIG. 5 is a cross section taken at the line V—V of FIG. 4, showing a cross section of the pole piece made by combining the perforated plates shown in FIG. 4.

The above-mentioned different embodiment of pole piece is shown in FIG. 5 in a cross section taken on the line V—V of FIG. 4. As mentioned above, this second embodiment of pole piece is constituted by the perforated plates 31*a* to 31*d* in FIG. 4. The perforated plates 31*a* to 31*d* in FIG. 5 are arranged or combined together in layers in a coaxial manner, i.e., with the centers 33 (FIG. 4) of the plates 31*a* to 31*d* being linked with one another by the same vertical straight line, but are located with angles α differing slightly from those of the adjacent plates. Therefore, the perforations 32*a* to 32*d* of the plates are not in contact with one another at the entire areas thereof, but communicate with one another with portions being in noncontact with the adjacent perforations, in other words, the perforations 32*a* to 32*d* are unaligned with one another in any cross section parallel with the above-mentioned straight line or common axis of the plates 31*a* to 31*d*. Consequently, each one of the perforations of each plate provides a plurality of edges 37 exposed to the flow opening formed by the perforations of the plates.

Such a lack of alignment of the perforations 32*a* to 32*d* in their relative positions provides the construction herein with a still higher filtering capacity. That is, when a stream of fluid flows in the direction indicated by an arrow 35, the stream of fluid is prevented from flowing normally in a straight manner, but disturbed partly by the above-mentioned edges 37 of the perforated plates. Therefore, when passing through the filter element 13, the stream of fluid is in a turbulent condition so that the fluid comes in touch with the attracting surface of the filter element 13 more frequently so that more amount of ferromagnetic particles in the fluid can be attracted by the filter element 13. In addition, walls 36 of each perforated plate provide a passage for the magnetic line of force, and in the arrangement lacking the alignment of the perforations, more amount of the magnetic line of force leaks from the exposed edges 37 of the plates so that the ferromagnetic particles contained in the fluid may become magnetized, and attracted by the edges 37 of the plates. That is, although in a coarse manner, the pole piece itself can filter the fluid so as to reduce the filtering load of the filter element 13, preventing the filter element 13 from being clogged at an earlier time.

Although the perforations 32*a* to 32*d* shown in FIGS. 4 and 5 have a square shape, they may have alternative shapes such as a circle or triangle. The pole piece may be constructed by using any number of perforated plates other than one.

As many apparently widely different embodiments of this invention may be made without departing from the spirit and scope thereof, it is to be understood that the invention is not limited to the specific embodiments thereof except as defined in the appended claims.

What is claimed is:

1. A magnetic filter comprising:

(i) a filter container having an inlet and an outlet, (ii) a sealed hollow inner body disposed coaxially within said filter container and bounding therewith an annular passage communicating with said inlet and outlet, (iii) an annular filter element of magnetizable material disposed coaxially in said container across said annular passage and having an upstream face and a downstream face, (iv) a pair of annular perforated pole pieces disposed coaxially in said container and across said flow passage and abutting respectively said upstream face and said downstream face of said filter element, the perforations of said pole pieces providing a plurality of flow paths therethrough, and (v) a magnetic field generating device disposed in said inner body and comprising an iron core, a coil wound round said core, and a DC power supply means including an electric wire connected to said coil for energizing the same, said core and coil being disposed coaxially within said pole pieces for transmitting a magnetic field through said pole pieces to said filter element for magnetizing said filter element.

2. A magnetic filter, as claimed in claim 1, wherein said iron core is of greater axial thickness than said filter element, and includes two end portions and a central smaller-diameter portion between said end portions, said central portion having substantially the same axial thickness as said filter element, said coil being wound on said central portion, one of said pole pieces having an inner circumferential surface facing an outer circumferential surface of one said end portion, and the other of said pole pieces having an inner circumferential surface facing an outer circumferential surface of the other said end portion.

3. A magnetic filter, as claimed in claim 2, wherein each of said pole pieces comprises a plurality of perforated plates stacked along the direction of said flow path, with their perforations in communication, and wherein said iron core comprises a plurality of plates stacked in said direction.

4. A magnetic filter, as claimed in claim 3, wherein one of said pole pieces located at the inlet side of said magnetic filter has its perforated plates positioned relative to each other such that the perforations thereof do not coincide over their entire area, whereby each perforated plate presents a plurality of edges into the paths of flow through the pole piece.

* * * * *